(12) United States Patent
Simmons et al.

(10) Patent No.: US 10,501,104 B2
(45) Date of Patent: Dec. 10, 2019

(54) PORTABLE TOTE CART

(71) Applicants: Stanley R Simmons, Winter Springs, FL (US); Leon F Wasson, St. Johns, FL (US)

(72) Inventors: Stanley R Simmons, Winter Springs, FL (US); Leon F Wasson, St. Johns, FL (US)

(*) Notice: Subject to any disclaimer, the term of this patent is extended or adjusted under 35 U.S.C. 154(b) by 0 days.

(21) Appl. No.: 16/038,377

(22) Filed: Jul. 18, 2018

(65) Prior Publication Data

US 2019/0023299 A1 Jan. 24, 2019

Related U.S. Application Data

(60) Provisional application No. 62/562,675, filed on Sep. 25, 2017, provisional application No. 62/533,759, filed on Jul. 18, 2017.

(51) Int. Cl.
*B62B 3/02* (2006.01)
*B60B 35/02* (2006.01)
*F16C 11/10* (2006.01)

(52) U.S. Cl.
CPC ............ *B62B 3/022* (2013.01); *B60B 35/025* (2013.01); *B62B 2205/10* (2013.01); *B62B 2205/30* (2013.01); *B62B 2301/05* (2013.01); *F16C 11/10* (2013.01)

(58) Field of Classification Search
CPC ........... B62B 3/022; B62B 3/02; B62B 3/002; B62B 2205/10; B62B 2205/30; B62B 2301/05; B60B 35/025; F16C 11/10

USPC .......................................................... 280/651
See application file for complete search history.

(56) References Cited

U.S. PATENT DOCUMENTS

| 3,693,993 | A | | 9/1972 | Mazzarelli et al. |
| 4,316,615 | A | | 2/1982 | Willette |
| 4,362,308 | A | | 12/1982 | Hicks et al. |
| 4,376,547 | A | | 3/1983 | Dominko |
| 4,521,054 | A | | 6/1985 | Deconinck |
| 4,645,262 | A | | 2/1987 | Furubotten |
| 4,659,142 | A | | 4/1987 | Kuchinsky, Jr. |
| 4,733,905 | A | | 5/1988 | Buickerood et al. |
| 5,040,807 | A | | 8/1991 | Snover |
| 5,056,804 | A | | 10/1991 | Wilson et al. |
| 5,364,112 | A | * | 11/1994 | Jackson ................. A47C 7/006 280/30 |
| 5,423,592 | A | | 6/1995 | Spurrier et al. |
| D367,347 | S | | 2/1996 | Moudrianakis |
| 5,492,347 | A | | 2/1996 | Palmeri et al. |
| 5,658,054 | A | * | 8/1997 | Wu ........................ B60B 37/10 301/111.06 |
| 5,915,723 | A | * | 6/1999 | Austin ..................... B62B 3/02 280/43 |
| 6,079,777 | A | * | 6/2000 | Simmons ............... A47C 1/143 108/157.17 |
| 7,114,730 | B2 | * | 10/2006 | Cheldin ................ B62B 5/0026 280/47.24 |
| 7,438,355 | B2 | * | 10/2008 | Pedemonte ............ A47C 1/143 297/17 |

(Continued)

*Primary Examiner* — John D Walters
(74) *Attorney, Agent, or Firm* — William M. Hobby, III

(57) ABSTRACT

This invention is for an improved combination chaise lounge and tote cart and especially to an chaise lounge and tote cart which can be folded to a storage position and can be quickly converted between a tote cart and a chaise lounge.

18 Claims, 7 Drawing Sheets

(56) References Cited

U.S. PATENT DOCUMENTS

| | | | |
|---|---|---|---|
| 8,376,391 B2 * | 2/2013 | Voves | B62B 1/12 |
| | | | 280/47.26 |
| 8,608,188 B2 * | 12/2013 | Goldszer | B62B 1/008 |
| | | | 280/651 |
| 8,851,503 B2 | 10/2014 | Tyson, III | |
| 9,061,695 B1 | 6/2015 | Mann | |
| 9,150,230 B2 * | 10/2015 | Panigot | B62B 1/12 |

* cited by examiner

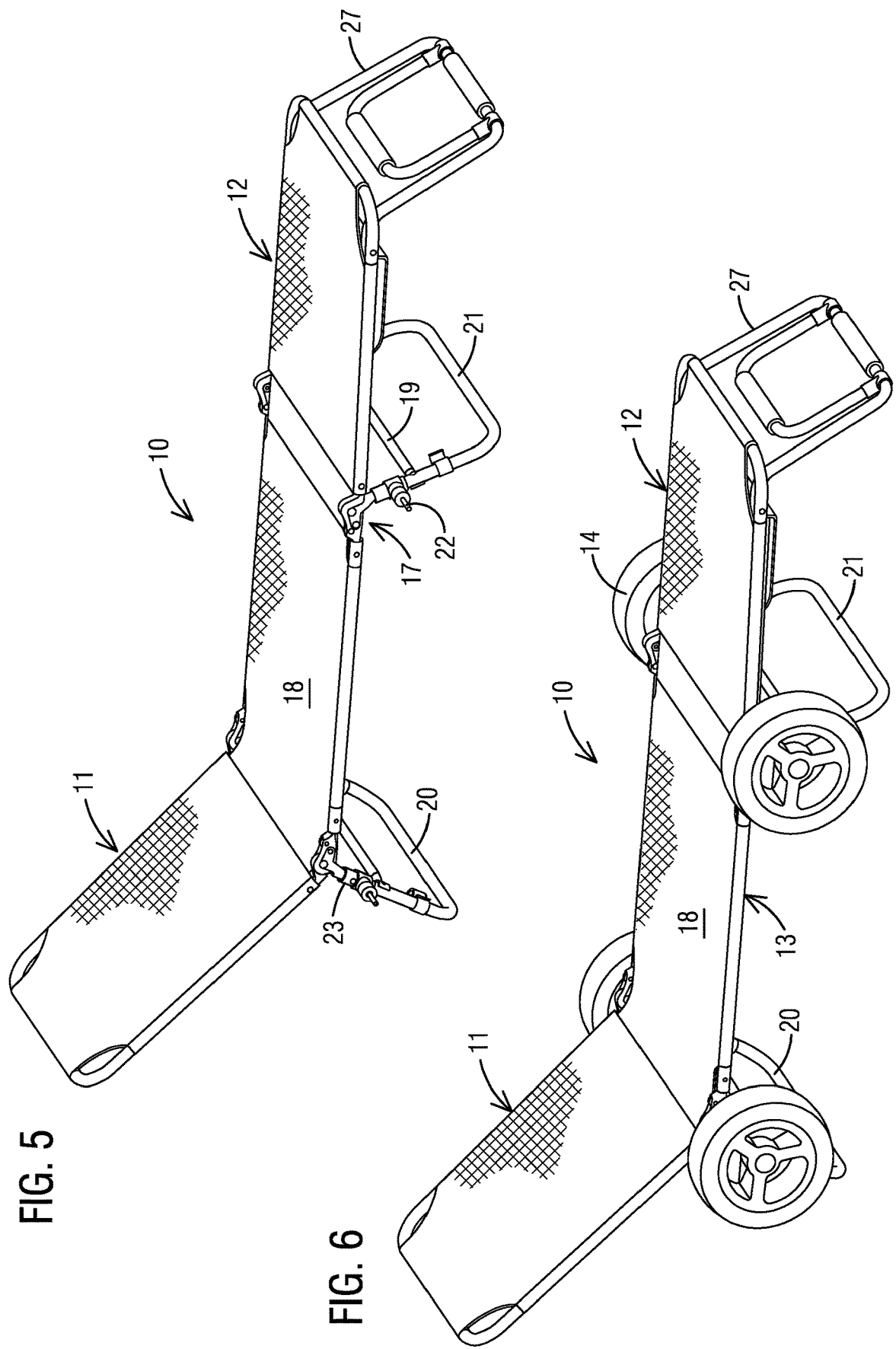

PORTABLE TOTE CART

This application claims the benefit of U.S. Provisional Application No. 62/562,675, filed Sep. 25, 2017 and for U.S. Provisional Application No. 62/533,759 filed Jul. 18, 2017.

FIELD OF THE INVENTION

This invention relates to an improved combination chaise lounge and tote cart and especially to a chaise lounge and tote cart which can be folded to a storage position and which is an improvement over my prior U.S. Pat. No. 6,079,777 for a Combination Chaise Lounge and Tote Cart.

BACKGROUND OF THE INVENTION

Outdoor activities have become increasingly popular and many of these activities take the form of picnics or days at the beach. On these type of outings, there is frequently no provision for chairs or lounges so that portable foldable chairs and lounges are brought to the location of the outing. In addition, it is frequently necessary to transport various items, such as coolers, blankets, surfboards, and the like, from an automobile to a desired beach or picnic area. The carrying of the various items including the portable seating and lounge devices may require several people or several trips between the car and the beach. Some of the items, such as a cooler full of beverages and ice, can be of considerable weight and can be hazardous for an individual to tote for a long distance. Foldable chairs and beach lounges are commonly available made out of lightweight aluminum tubular frames having a fabric covering which can be folded for storage or for transportation to an outing location. It has also been suggested to provide foldable chairs and lounges with wheels so that they can be rolled to different locations. These wheeled chairs or lounges can be used for carrying a cooler or other items thereon. However, such wheeled chairs and lounges typically have not provided for toting of large items or a large number of items held in a manner that can be easily reloaded and removed after an outing.

Typical prior art wheeled foldable chairs can be seen in the Buickerood et al. U.S. Pat. No. 4,733,905, for a combination chair and cart. A two wheeled vehicle is made to collapse into a retracted position and converts between a two wheeled cart and a chair. It allows one portion of the frame to be used for a handle when used as a cart. Another wheeled chair can be seen in the Palmeri et al. U.S. Pat. No. 5,492,347, in which a chair can be mobilized by attaching a pair of wheels mounted to an axle to the legs of the chair and then using the chair back for a handle. The Hicks et al. U.S. Pat. No. 4,362,308, is for a combination portable chair and container which has a single roller assembly for rolling the chair and container thereon. The chair converts to a rolling container with sides that can be folded into a compact position for storage.

Wheeled chaise lounges can be seen in the Dominko U.S. Pat. No. 4,376,547, which is a lounge chair assembly made convertible by a wheel assembly which clamps onto the lounge chair frame. The Kuchinsky, Jr. U.S. Pat. No. 4,659, 142, is for a combination beach caddie and beach chair which has a single roller assembly attached to the frame of a chair in such a manner that a portion of the frame can be used for a handle for pushing the beach chair on the roller. The Snover U.S. Pat. No. 5,040,807, is a combination beach chair and wheelbarrow apparatus which has a single wheel connected to the frame of a beach chair and also allows the frame of the beach chair to act as a handle for pushing the beach chair on the wheel when used as a wheelbarrow. The Wilson et al. U.S. Pat. No. 5,056,804, is a folding lounge chair and cart which has a pair of wheels attached to the frame of a folding lounge chair and allows the lounge chair to be extended in a straight position and, when turned over to act as a hand truck. The Mazzarelli et al. U.S. Pat. No. 3,693,993, is for a convertible beach tote cart which uses a single roller on one end of the framework while the other end of the framework of the lounge chair can be used as a handle to push the tote cart. Other folding chairs or folding lounges which have been wheeled for a combination of uses can be seen in the Jackson patent, U.S. Pat. No. 5,364,112, for a wheel assembly for a combination folding chair and cart and in the Deconinck U.S. Pat. No. 4,521,054, for a chaise lounge and in the Wilson et al. U.S. Pat. No. 5,056, 804, for a folding lounge chair and cart and in the Spurrier et al. U.S. Pat. No. 5,423,592, for a combination folding lounge chair and wagon. In the Furubotten U.S. Pat. No. 4,645,262, a camp chair converts to a hand truck. Beach cart patents can be seen in the Willette U.S. Pat. No. 4,316,615 and in the Moudrianakis U.S. Design Pat. No. 367,347. The Tyson III U.S. Pat. No. 8,851,503 is a dual chair beach wagon in which a beach cart can be converted into a pair of beach chairs while the Mann U.S. Pat. No. 9,061,695 is for a multi purpose beach cart.

In my prior U.S. Pat. No. 6,079,777, I provided a standard folding chaise lounge with a four wheel base which folds up for storage and rapidly converts to a tote cart which is pulled with a handle and which can carry a cooler, a surfboard, towels, and other beach paraphernalia as well as fishing rods, suntan lotion, and the like. The combination chaise lounge and tote cart rapidly convert between a stored position, a pull-type beach cart, and a chaise lounge in which the folding wheels act as a base for the chaise lounge as well as for the wheels for rolling the cart.

SUMMARY OF THE INVENTION

This invention relates to an improved combination chaise lounge and tote cart and especially to a chaise lounge and tote cart which can be folded to a storage position and can be quickly converted between a tote cart and a chaise lounge. This invention incorporates a novel hinge to allow firm locking in any desired position and an improved axle and wheel system.

A foldable recreational tote cart has a frame having a base frame member having two end portions and having a front frame member being hingedly attached with a pair of hinges to one end portion of the base frame member and a rear frame member hingedly attached with a pair of hinges to the other end portion of the base frame member. Each of the front and rear frame member hinges allow the front frame member and the rear frame member to be folded from an upright position to a collapsed folded position. Each hinge has a hinge lock to lock the front and rear frame members in a plurality of positions. A pair of generally U-shaped leg members are rotatably attached to the base frame member. An axle is rotatably attached to each side of each leg member and has a wheel supporting spindle protruding therefrom. Each axle is rotatable between a wheel supporting position and a folded position A plurality of wheels are each removably attached to one axle spindle and rotatable thereon. The tote cart may have the wheels removed and the axles rotated inwardly and each leg member folded on the base frame member and the front and rear frame members folded on the base frame member to fully collapse the cart for storage. A novel hinge holds the front and rear frame members to the base frame at any of a plurality of positions.

BRIEF DESCRIPTION OF THE DRAWINGS

The accompanying drawings, which are included to provide further understanding of the invention, are incorporated in and constitute a part of the specification and illustrate an embodiment of the invention and together with the description serve to explain the principles of the invention.

In the drawings:

FIG. 5 is a perspective view of the tote cart extended into a chaise lounge having the wheels removed;

FIG. 6 is a perspective view of the tote cart extended into a chaise lounge with the wheels attached;

DETAILED DESCRIPTION OF AN EXEMPLARY EMBODIMENT

Figure 1:
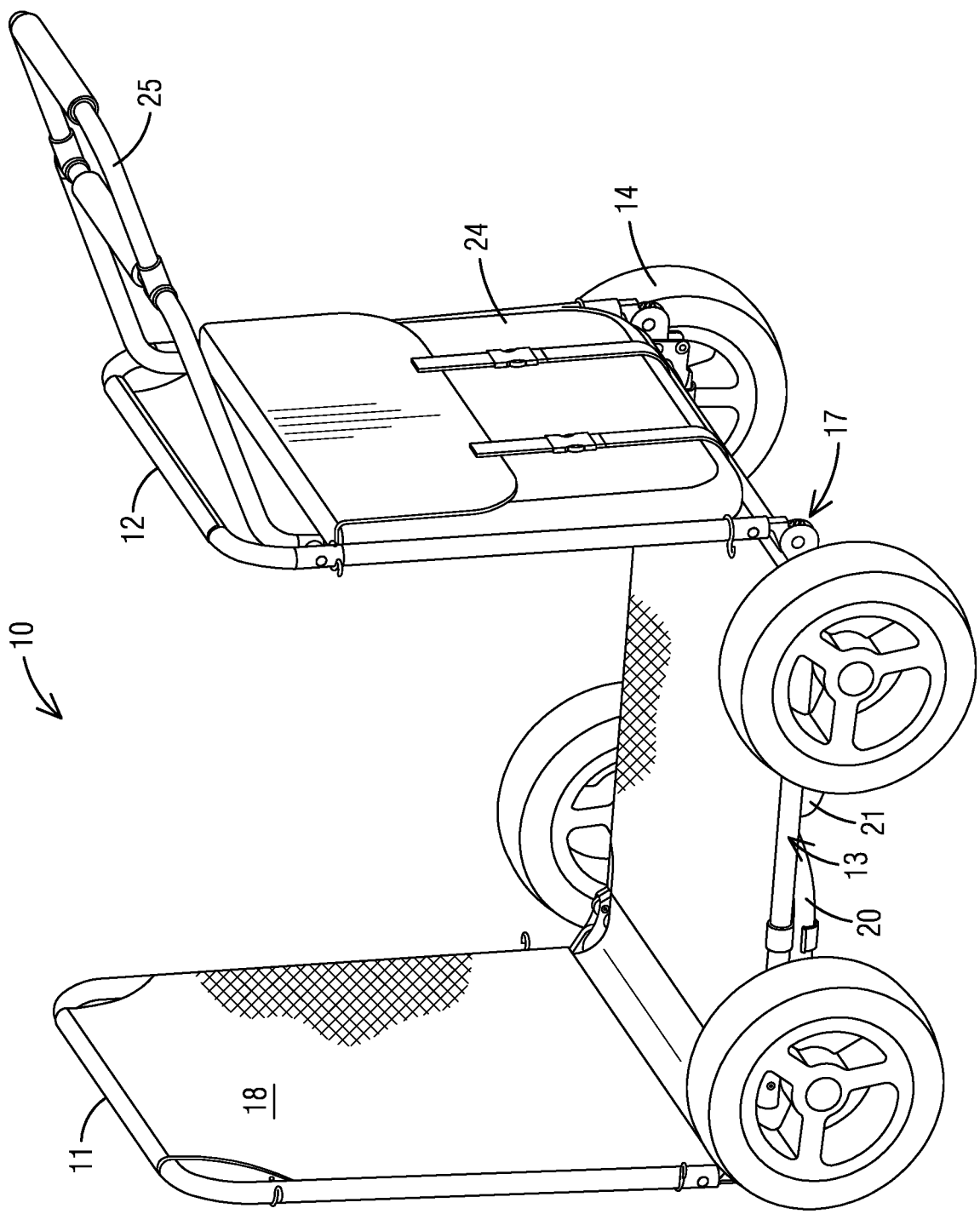
FIG. 1 is a perspective view of the tote cart of the present invention.
Figure 2:
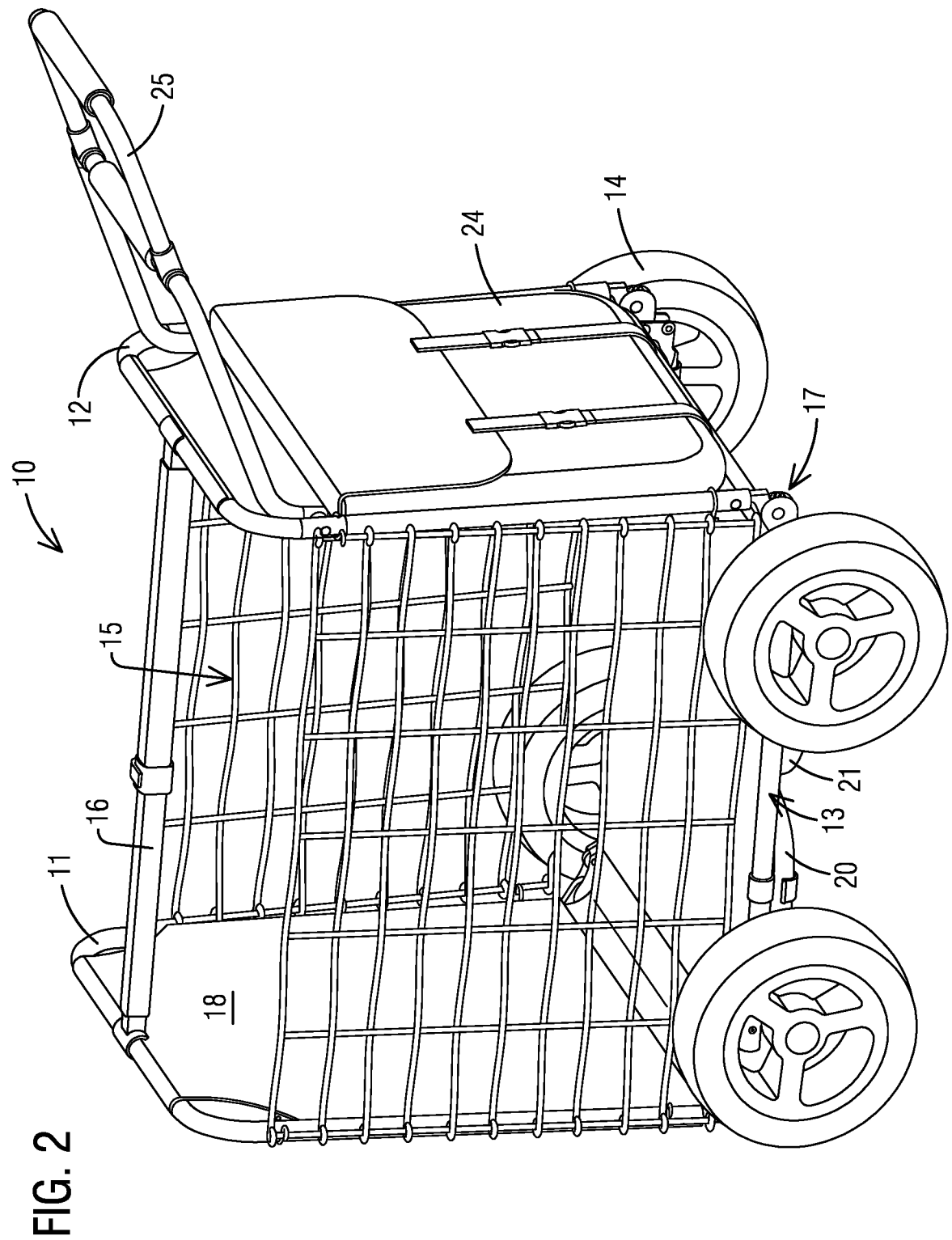
FIG. 2 perspective view of the chaise lounge tote cart of FIG. 1 having the optional netting and telescoping cross member attached.

Referring to FIGS. 1 through 10, a tote cart 10 has a front frame member 11 and a rear frame member 12 and a base frame 13 and a plurality of wheels 14 as seen in FIG. 1. In FIG. 2, the tote cart has optional netting 15 covering two sides and an optional telescopic brace 16. As will be understood, this optional brace is not necessary to the operation of the cart since the frame members 11 and 12 are held upright by the new locking hinges 17 as will be described in more detail later. A pair of axle supporting legs 20 and 21, each having a horizontal cross-bar 19, can be better viewed in FIGS. 5 and 6. As more clearly seen in FIGS. 10 and 11, each axle 23 has a spindle 22 that supports a removable wheel 14. Each axle 23 has an axle supporting sleeve 46 rotatably mounted on leg 20 or 21. Each wheel is removably and rotatably attached to a spindle 22 with a spring clip in a groove 50. With the wheels removed from the spindle 22 or even with the wheels still mounted on the spindle, each axle 23 can be rotated on the supporting leg 20 or 21 when folding the cart for storage. The axles may be locked in place with a pin placed through an aperture 48 in the sleeve 46 and legs 20 or 21 but in the preferred embodiment a spring biased spindle 22 can be slid into an aperture in one of the legs 20 or 21 as more clearly shown in FIGS. 10 and 11. A tote cart storage pouch 24 is shown in FIGS. 1 and 2 attached to the rear frame member 12 which is used to store the wheels 14 when the tote cart is collapsed. A foldable handle 25 is also attached to the rear frame 12. The handle may also be a telescoping and can also be used as a footrest when set up as a lounge chair. The frame members 11 and 12 and the base 13 are each covered with a fabric 18 or other material as desired.

Figure 3:
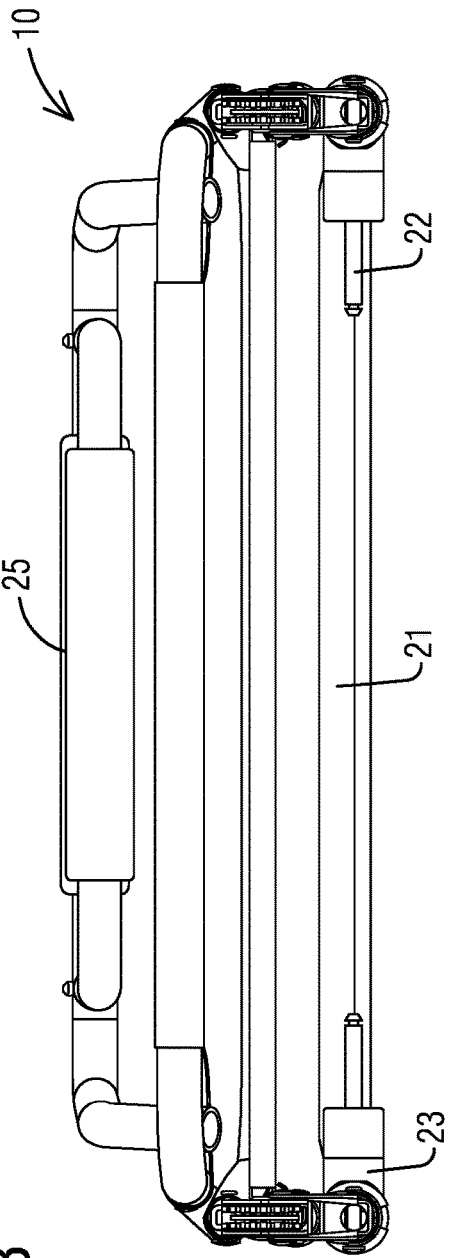
FIG. 3 is an elevation of the cart of FIGS. 1 and 2 in a folded storage position with the axles in a rotated position.
Figure 4:
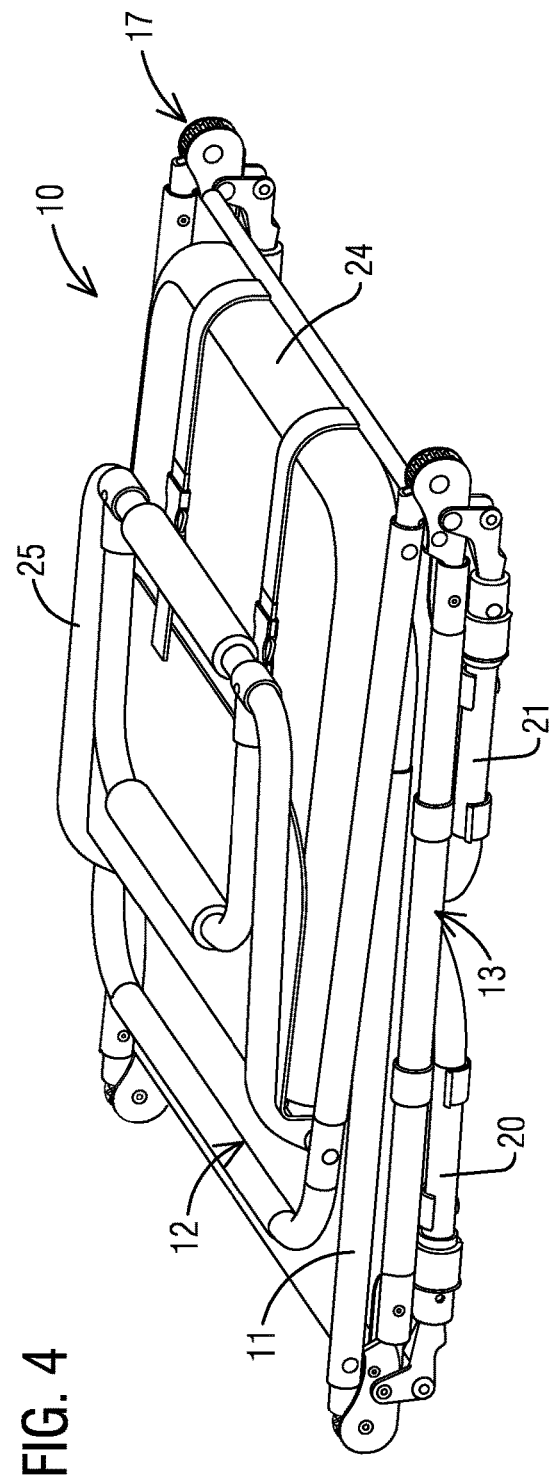
FIG. 4 is an elevation of the tote cart of FIGS. 1 and 2 in a folded storage position with the wheels removed.

Referring to the drawings FIGS. 3 and 4, the tote cart 10 is shown in folded position for a storage. The wheels 14 have been removed from the axles and stored in the storage pouch 24 and the axles 23 have been rotated on the axle supporting sleeves 46 to face inwardly. The axle supporting legs 21 and 22 have been folded on the hinges 17 as have the frame members 11 and 12. A foldable handle 25 is folded over the storage pouch 24. The tote cart 10 is in a complete folded position as shown in FIGS. 3 and 4 for storage or transportation while taking up minimal storage space.

As more clearly seen in FIGS. 5 and 6, the tote cart can be unfolded and expanded into a lounge chair. The front frame 11 and the rear frame 12 are positioned with the hinges 17 on the base 13 as shown in FIGS. 5 and 6. The handle 25 is lowered on the rear frame member 12. The wheels 17 may be left attached as shown in FIG. 6 or removed as shown in FIG. 5. The axle supporting sleeves can be rotated inwardly if desired. The positioning of the frame components is achieved by the hinges 17 which allows the frame members to rotate to different positions and locked in any position desired. This hinge locking system provides great strength and rigidity when used as a tote cart.

Figure 7:
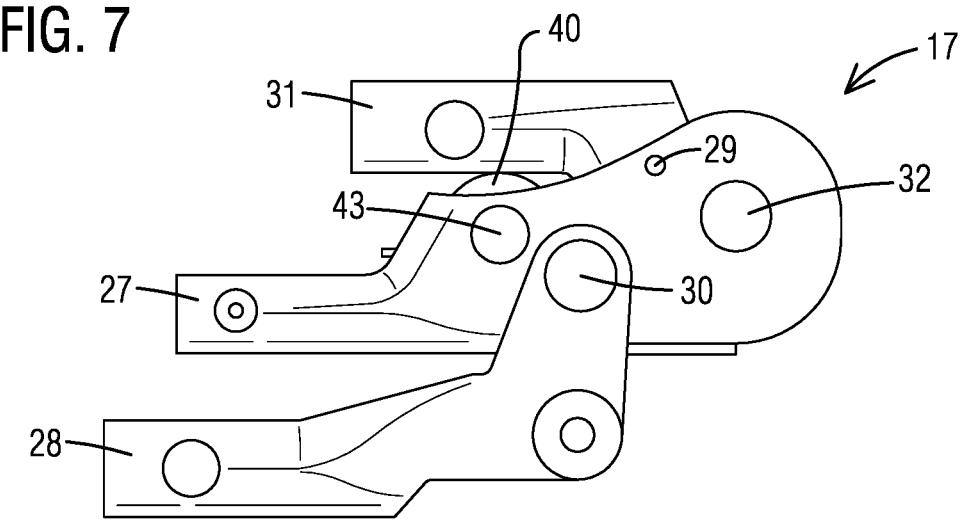
FIG. 7 is a side elevation of the locking hinge used in the cart of the present invention.
Figure 8:
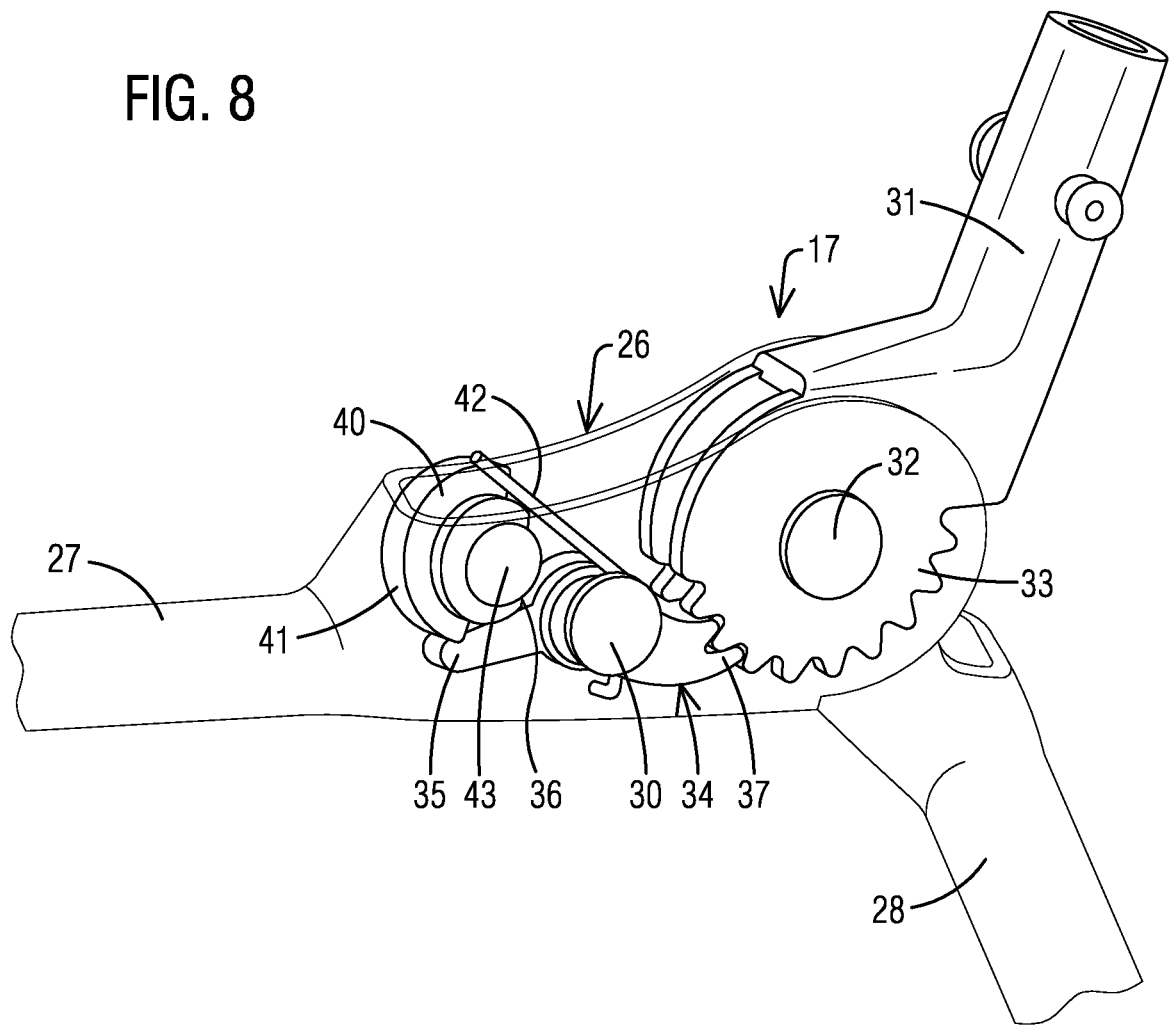
FIG. 8 is cut-a-way view of the hinge of FIG. 7 illustrating its operation.

Referring to FIGS. 7 and 8, the hinge 17 is illustrated having a frame 26 having a fixed leg and a leg 28 rotatably pinned with a pin or rivet 30. A rotatable leg 31 is rotatably held by a rivet or pin 32 and can be locked in different positions as hereinafter shown in FIG. 8. The hinge has a ratchet 33 and pawl 34 mechanism used to lock the leg 31 in a desired position. The ratchet 33 is fixedly attached to the leg 31 and rotates with the leg unless it is locked in position. The pawl 34 has a lever arm 35 extending from the rear thereof and has a spring 42 positioned therearound that biases the pawl 34 to push the pawl teeth 37 into the ratchet teeth. A locking or cam wheel 40 can be seen having an arcuate area 41 and a flattened area 36 and is rotatably pinned to the frame 26 with a rivet or pin 43. A portion of the locking cam 40 arcuate area 41 extends out an opening in the frame 26 as seen in FIG. 7 to form a thumbwheel. The locking cam 40 can be rotated against the pawl lever arm 35 to lock the pawl teeth 37 in the ratchet teeth to lock the ratchet wheel and leg 31 in place at any position of the ratchet 33. The locking cam 40 can then be rotated to align the flat area 36 over the pawl lever arm 35 to free the pawl so that the leg 31 can move thereby moving the ratchet 33. The ratcheting leg can be rotated until it reaches another desired position and the locking cam 40 rotated to lock the pawl 34 in the ratchet 31 teeth with leg 31 at the desired location. A simplified hinge locking system can use the aperture 29 for inserting a pin to lock the hinge in place with the front or rear frame members 11 or 12 in an upright position.

Figure 9:
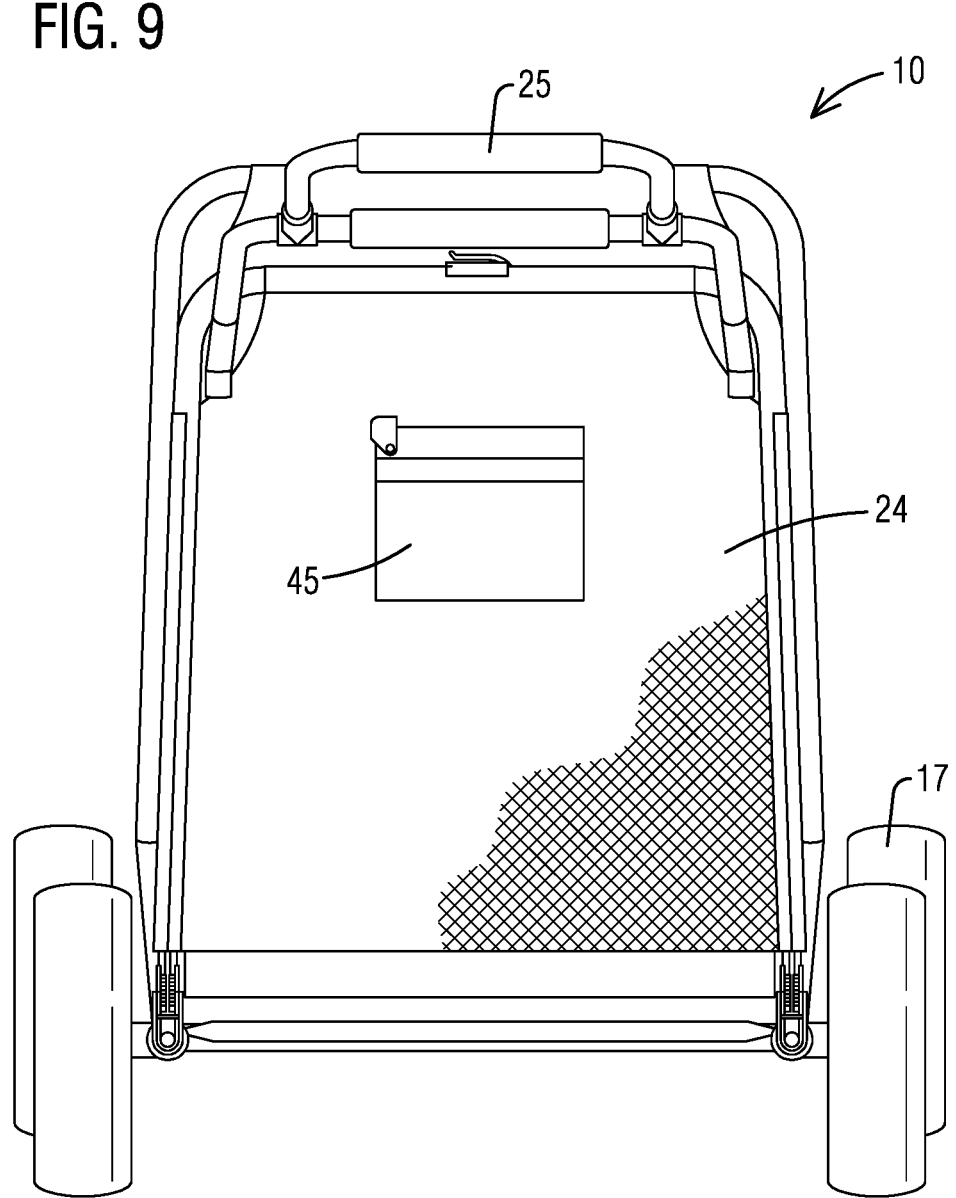
FIG. 9 is a rear elevation of the tote cart showing the position of a hidden valuables pouch.

FIG. 9 is a rear elevation of a tote bag on the tote cart 10 for holding the wheels 14 when removed from the axles when the cart is in a storage position as shown in FIGS. 3 and 4 or if desired when the cart is in a lounge position as in FIG. 5. The tote bag is attached to the rear frame member 12 and has a lockable pouch 45 which is a hidden water resistant, theft resistant pouch for holding valuables such as for keeping a wallet or watch, cell phone, or other items for safekeeping while swimming or doing other outside activities.

Figure 10:
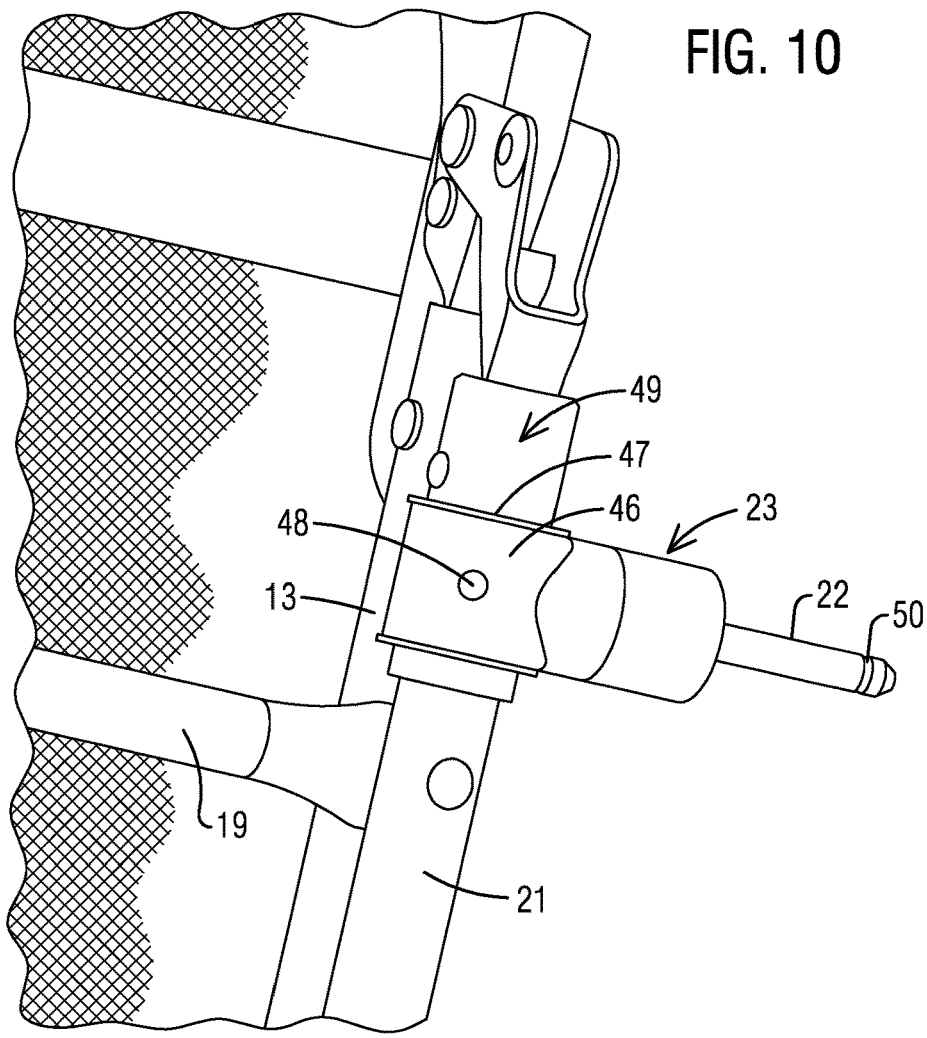
FIG. 10 is a partial perspective view of the rotating axle of the present invention.

FIG. 10 more clearly shows the axle 23 supporting the wheel spindle 22 which removably supports a wheel 14. Each axle 23 has a sleeve 46 rotatably attached to one of the supporting legs 20 or 21 above the cross-bar 19. Each axle 23 spindle 22 supports a removable wheel 14. The axle 23 sleeve 46 may rotate on a bushing 49 or directly on the supporting legs 20 or 21 and is rotatably held in position by a pair of retainer rings 47. The bushing 49 is shown held in place on the leg 21 with a retainer screw. The axle supporting sleeve 46 allows the axles 23 to rotate on the bushing 49 or on a leg around the leg 21 when the wheels are removed and the tote cart is folded for storage. The wheels also may be left on when rotating the axle. The axle sleeves may be locked in place with a pin inserted through the aperture 48 in the sleeve 46 and leg 21 but the preferred method is for the spindle 22 to be spring biased in the axle 23 for sliding the spindle into an aperture in one of the legs 20 or 21 as more clearly shown in FIG. 11. The wheels 14 are stored in the tote cart storage pouch 24 when removed from the axle spindles 22 and the axles rotated for storage when the tote cart is collapsed for storage. Each spindle 22 has a spring clip 50, or the like, on the end thereof for holding the wheel in place when the wheel 14 is mounted on the spindle 22.

Figure 11:
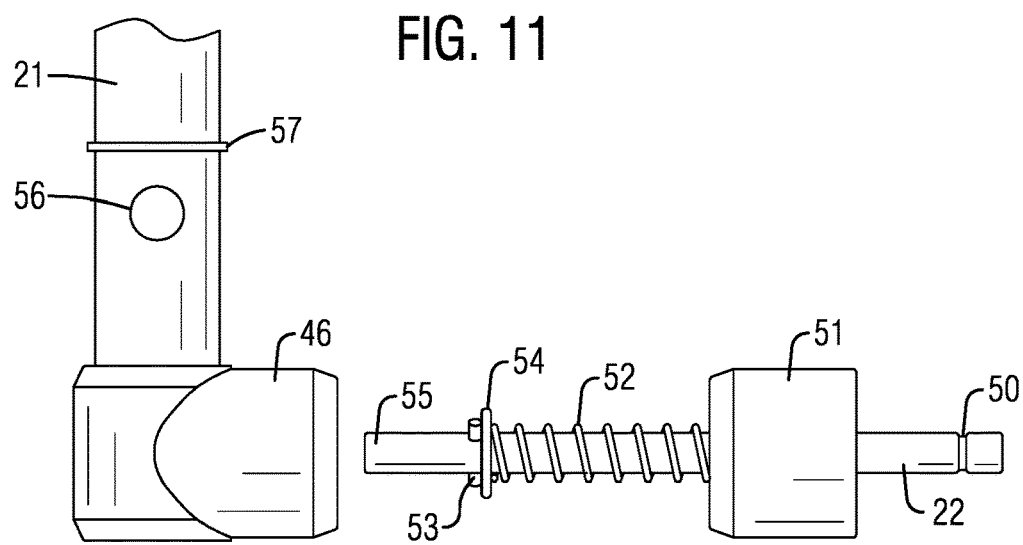
FIG. 11 is a partial exploded view of the rotating axle assembly of FIG. 10.

Referring to FIG. 11, an exploded view of the rotating axle 23 of FIG. 10 has the wheel supporting spindle 22 passing through an axle cover 51. The spindle 22 can be seen to have a coiled spring 52 therearound inside the cover 51 and having a spindle stop 53 and washer 54. The spindle end 55 fits into the axle supporting sleeve 46 with the end 55 and presses against the leg 21 when the axle cover 51 is attached to the axle supporting sleeve 46 when the axle supporting sleeve 45 is rotatably mounted over the leg 21. The axle supporting sleeve 45 is held in position with the spindle end 55 aligned with the opening 56 in the leg 21 by a pair of spring clips 57 fitted into grooves. When the axle sleeve 46 is rotated, the spring biased spindle 22 end 55 will slide into the aperture when they become lined up during rotation of the axle sleeve 46. To rotate the axle from a wheel aligned position, the spindle 22 is grasped and pulled against the spring 52 and the axle rotated to rotate the sleeve 46 and spindle 22. The spindle end 55 will then ride on the surface of the leg 21 during rotation of the axle for storage or the like.

It should be clear at this time that an improved combination chaise lounge and tote cart and especially to a chaise lounge and tote cart which can be folded to a storage position has been provided. However the present invention is not to be considered limited to the forms shown which are to be considered illustrative rather than restrictive.

We claim:

1. A foldable recreational tote cart comprising:
   a frame having a base frame member having two end portions and having a front frame member being hingedly attached with a pair of hinges to one end portion of said base frame member and a rear frame member hingedly attached with a pair of hinges to the other end portion of said base frame member, each said front and rear frame member hinges allowing the front frame member and the rear frame member to be folded from an upright position to a collapsed folded position, and each said hinge having a hinge lock to lock said front and rear frame members in a plurality of positions;
   a pair of generally U-shaped leg members rotatably attached to said base frame member;
   an axle being rotatably attached to each side of each said leg member and having a wheel supporting spindle protruding therefrom, each said axle being rotatable between a wheel supporting position and a folded position, each said axle having an axle sleeve rotatably supported on one said lea for rotating said axle from a wheeled position to a storage position and each said axle wheel supporting spindle being slidably mounted through said rotatable axle sleeve and alignable with an aperture in said leg; and
   a plurality of wheels, each wheel being removably attached to one said axle spindle and rotatably thereon;
   whereby said tote cart may have the wheels removed and the axles rotated inwardly and each said leg member folded on said base frame member and said front and rear frame members folded on said base frame member to fully collapse said cart for storage and transportation.

2. The foldable recreational tote cart in accordance with claim 1 in which each said axle wheel supporting spindle has a coil spring thereover biasing said spindle one end against said leg and into said aperture when the end thereof is aligned with said aperture in said leg.

3. The foldable recreational tote cart in accordance with claim 2 in which said cart leg has a snap fastener on each side of said rotatable axle sleeve for maintaining said sleeve for alignment of said spindle end over said aperture as said sleeve is rotated on said cart leg.

4. The foldable recreational tote cart in accordance with claim 3 in which each said axle wheel supporting spindle is slidably mounted through said rotatable axle sleeve and alignable with an aperture in said leg.

5. The foldable recreational tote cart in accordance with claim 4 having an axle bushing mounted on each said leg and having said axle sleeve rotating thereon.

6. The foldable recreational tote cart in accordance with claim 5 in which each said axle bushing has a pair of spring clips, one retainer ring positioned on each side of said axle sleeve for holding said axle in position on said bushing.

7. The foldable recreational tote cart in accordance with claim 1 in which each said front and rear frame member hinge has a hinge frame and a first arm fixedly attached to said base frame member and a second arm rotatably attached to one of said front or rear frame members, said second arm having a ratchet attached thereto, and said hinge frame having a pawl having a ratchet engaging pawl arm movably attached thereto and movable to engage said ratchet to lock said ratchet and second arm in a predetermined position.

8. The foldable recreational tote cart in accordance with claim 7 in which said hinge lock includes a cam rotatably attached to said hinge frame and positioned for engaging said pawl to lock said second arm ratchet in a preselected position.

9. The foldable recreational tote cart in accordance with claim 8 in which said pawl has a lever arm extending therefrom positioned for engagement with said cam for locking said pawl into engagement with said second arm ratchet.

10. The foldable recreational tote cart in accordance with claim 9 in which each said ratchet engaging pawl arm is spring biased away from said ratchet until said cam locks said rachet in place.

11. The foldable recreational tote cart in accordance with claim 1 having a telescoping handle hingedly attached to said rear frame member, said handle being foldable onto said rear frame member when said cart is collapsed.

12. The foldable recreational tote cart in accordance with claim 1 in which a wheel pouch is mounted onto said rear frame member and adapted to hold said plurality of wheels when said plurality of wheels are removed from said axle spindles.

13. The foldable recreational tote cart in accordance with claim 1 including a telescoping brace removably mounted between said front and rear frame member and having a net removably attached between each side of said front and rear frame member.

14. A foldable recreational tote cart comprising:
a frame having a base frame member having two end portions and having a front frame member being hingedly attached with a pair of hinges to one end portion of said base frame member and a rear frame member hingedly attached with a pair of hinges to the other end portion of said base frame member, each said front and rear frame member hinges allowing the front frame member and the rear frame member to be folded from an upright position to a collapsed folded position, and each said front and rear frame member hinge having a hinge frame and a first arm fixedly attached to said base frame member and a second arm rotatably attached to one of said front or rear frame members, said second arm having a ratchet attached thereto, and said hinge frame having a ratchet engaging pawl arm movably attached thereto and movable to engage said ratchet to lock said ratchet and second arm in a predetermined position, and said pawl also having a lever arm extending therefrom, said hinge having a cam rotatably attached to said hinge frame and positioned for engaging said pawl lever arm to lock said second arm ratchet in a preselected position;
a pair of generally U-shaped leg members rotatably attached to said base frame member;
an axle being rotatably attached to each side of each said leg member and having a wheel supporting spindle protruding therefrom each said axle being rotatable between a wheel supporting position and a folded position; and
a plurality of wheels, each wheel being removably attached to one said axle spindle and rotatably thereon;
whereby said tote cart may have the wheels removed and the axles rotated inwardly and each said leg member folded on said base frame member and said front and rear frame members folded on said base frame member to fully collapse said cart for storage or transportation.

15. The foldable recreational tote cart in accordance with claim 14 in which each said axle has a sleeve rotatably supported on one said leg for rotating said axle from a wheeled position to a storage position.

16. The foldable recreational tote cart in accordance with claim 15 in which each said wheel supporting spindle is slidably mounted through said rotatable sleeve and alignable with an aperture in said leg.

17. The foldable recreational tote cart in accordance with claim 16 in which each said axle wheel supporting spindle has a coil spring thereover biasing said spindle against said leg and into said aperture when the end thereof is aligned with said aperture in said leg.

18. The foldable recreational tote cart in accordance with claim 17 in which said cart leg has a spring clip on each side of said rotatable sleeve for maintaining said sleeve for alignment of said spindle end over said aperture as said sleeve is rotated on said cart leg.

* * * * *